(12) United States Patent
Ding et al.

(10) Patent No.: US 12,131,728 B2
(45) Date of Patent: Oct. 29, 2024

(54) METHOD AND APPARATUS OF TRAINING NATURAL LANGUAGE PROCESSING MODEL, AND METHOD AND APPARATUS OF PROCESSING NATURAL LANGUAGE

(71) Applicant: Beijing Baidu Netcom Science Technology Co., Ltd., Beijing (CN)

(72) Inventors: Siyu Ding, Beijing (CN); Chao Pang, Beijing (CN); Shuohuan Wang, Beijing (CN); Yanbin Zhao, Beijing (CN); Junyuan Shang, Beijing (CN); Yu Sun, Beijing (CN); Shikun Feng, Beijing (CN); Hao Tian, Beijing (CN); Hua Wu, Beijing (CN); Haifeng Wang, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 296 days.

(21) Appl. No.: 17/828,773

(22) Filed: May 31, 2022

(65) Prior Publication Data
US 2022/0293092 A1 Sep. 15, 2022

(30) Foreign Application Priority Data

Jun. 30, 2021 (CN) .......................... 202110747046.X

(51) Int. Cl.
*G10L 15/00* (2013.01)
*G10L 15/02* (2006.01)
(Continued)

(52) U.S. Cl.
CPC ............ *G10L 15/063* (2013.01); *G10L 15/02* (2013.01); *G10L 15/18* (2013.01)

(58) Field of Classification Search
None
See application file for complete search history.

(56) References Cited

U.S. PATENT DOCUMENTS 11,704,602 B2 * 7/2023 Torres ................... G06F 40/126
706/12
2020/0364409 A1 11/2020 Perez et al.

FOREIGN PATENT DOCUMENTS

| CN | 110188358 A | 8/2019 |
|---|---|---|
| CN | 110222188 A | 9/2019 |

(Continued)

OTHER PUBLICATIONS

Li et al., "Survey of Natural Language Processing Pre-training Techniques", Computer Science, vol. 47, No. 3, Mar. 2020, 12 pages.

(Continued)

*Primary Examiner* — Shreyans A Patel
(74) *Attorney, Agent, or Firm* — Keating & Bennett, LLP

(57) ABSTRACT

The present application provides a method of training a natural language processing model, which relates to a field of artificial intelligence, and in particular to a field of natural language processing. A specific implementation scheme includes: performing a semantic learning for multi-tasks on an input text, so as to obtain a semantic feature for the multi-tasks, wherein the multi-tasks include a plurality of branch tasks; performing a feature learning for each branch task based on the semantic feature, so as to obtain a first output result for each branch task; calculating a loss for each branch task according to the first output result for the branch task; and adjusting a parameter of the natural language processing model according to the loss for each branch task. The present application further provides a method of processing a natural language, an electronic device, and a storage medium.

16 Claims, 7 Drawing Sheets

(51) Int. Cl.
    *G10L 15/06*     (2013.01)
    *G10L 15/18*     (2013.01)

(56) References Cited

FOREIGN PATENT DOCUMENTS

| | | | | |
|---|---|---|---|---|
| CN | 112417884 A | | 2/2021 | |
| CN | 112699686 A | | 4/2021 | |
| CN | 112988785 A | | 6/2021 | |
| CN | 113704388 A | * | 11/2021 | |
| CN | 111324695 B | * | 12/2022 | ......... G06F 16/3344 |
| CN | 110188358 B | * | 10/2023 | ............ G06F 40/211 |
| JP | 2020-140673 A | | 9/2020 | |

OTHER PUBLICATIONS

Dong et al., "Unified Language Model Pre-training for Natural Language Understanding and Generation", 33rd Conference on Neural Information Processing Systems, 1905.03197v3, Oct. 15, 2019, pp. 1-14.
Official Communication issued in corresponding Japanese Patent Application No. 2022-102621, mailed on Aug. 1, 2023.

\* cited by examiner

METHOD AND APPARATUS OF TRAINING NATURAL LANGUAGE PROCESSING MODEL, AND METHOD AND APPARATUS OF PROCESSING NATURAL LANGUAGE

CROSS-REFERENCE TO RELATED APPLICATION(S)

This application claims the priority of Chinese Patent Application No. 202110747046.X, filed on Jun. 30, 2021, the entire contents of which are hereby incorporated by reference.

TECHNICAL FIELD

The present disclosure relates to a field of an artificial intelligence technology, in particular to a natural language processing technology. More specifically, the present disclosure provides a method and an apparatus of training a natural language processing model, a method and an apparatus of processing a natural language, an electronic device, and a storage medium.

BACKGROUND

Recently, with a continuous development of a natural language processing technology, a pre-trained language model based on large-scale corpus has gradually become a classic framework. However, a current research on language models for different tasks such as a semantic understanding and a language generation is generally carried out independently in the industry. A semantic understanding model does not have an ability of language generation, and vice versa.

Therefore, how to make a model have both the ability of semantic understanding and the ability of language generation has become a problem to be solved.

SUMMARY

The present disclosure provides a method and an apparatus of training a natural language processing model, a method and an apparatus of processing a natural language, an electronic device, and a storage medium.

According to a first aspect, there is provided a method of training a natural language processing model, including: performing a semantic learning for multi-tasks on an input text, so as to obtain a semantic feature for the multi-tasks, wherein the multi-tasks include a plurality of branch tasks; performing a feature learning for each branch task based on the semantic feature, so as to obtain a first output result for each branch task; calculating a loss for each branch task according to the first output result for the branch task; and adjusting a parameter of the natural language processing model according to the loss for each branch task.

According to a second aspect, there is provided a method of processing a natural language, including: acquiring a to-be-processed text for a preset branch task; and performing a semantic learning for multi-tasks on the to-be-processed text by using a natural language processing model, so as to obtain a semantic feature for the multi-tasks, and performing a feature learning for the preset branch task according to the semantic feature, so as to obtain a processing result for the preset branch task, wherein the multi-tasks include the preset branch task, and the natural language processing model is trained using the method of training the natural language processing model described above.

According to a third aspect, there is provided an electronic device, including: at least one processor; and a memory communicatively connected to the at least one processor, wherein the memory stores instructions executable by the at least one processor, and the instructions, when executed by the at least one processor, cause the at least one processor to implement the method provided by the present disclosure.

According to a fourth aspect, there is provided a non-transitory computer-readable storage medium having computer instructions stored thereon, wherein the computer instructions allow a computer to implement the method provided by the present disclosure.

According to a fifth aspect of the present disclosure, there is provided a computer program product containing a computer program that, when executed by a processor, causes the processor to implement the method provided by the present disclosure.

It should be understood that content described in this section is not intended to identify key or important features in the embodiments of the present disclosure, nor is it intended to limit the scope of the present disclosure. Other features of the present disclosure will be easily understood through the following description.

BRIEF DESCRIPTION OF THE DRAWINGS

The accompanying drawings are used to understand the solution better and do not constitute a limitation to the present disclosure. wherein:

FIG. 3A, FIG. 3B and FIG. 3C show schematic diagrams of performing different branch tasks based on the above-mentioned natural language processing model according to an embodiment of the present disclosure.

DETAILED DESCRIPTION OF EMBODIMENTS

Exemplary embodiments of the present disclosure will be described below with reference to the accompanying drawings, which include various details of the embodiments of the present disclosure to facilitate understanding, and should be considered as merely exemplary. Therefore, those of ordinary skilled in the art should realize that various changes and modifications may be made to the embodiments described herein without departing from the scope and spirit of the present disclosure. Likewise, for clarity and conciseness, descriptions of well-known functions and structures are omitted in the following description.

In the technical solution of the present disclosure, an acquisition, a storage and an application of user personal information involved comply with provisions of relevant laws and regulations, and do not violate public order and good custom.

Natural language processing models are used more and more widely. As branches of natural language processing, a semantic understanding and a language generation have been significantly improved in their respective research fields. For example, in a field of the semantic understanding, classic pre-trained language models such as BERT, ERNIE and XLNet have been produced, which greatly improves effects of various natural semantic understanding tasks (such as text matching, sentiment classification, retrieval, etc.). In a field of the language generation, classic pre-trained language models such as GPT, BART and T5 have been produced, which greatly improves effects of various natural language generation tasks (such as text generation, text summary generation, generative question and answer, etc.).

However, a current research on language models for different tasks such as the semantic understanding and the language generation is generally carried out independently in the industry. A semantic understanding model does not have an ability of language generation, and vice versa. Therefore, when faced with a scenario in which both the ability of semantic understanding and the ability of language generation are required, two models need to be trained, which may greatly increase a consumption of resources and time.

At present, a scheme of using a unified pre-trained language model to perform a joint training of a semantic understanding task and a language generation task has been proposed in the industry. For example, UNILM (UNIfied pre-trained Language Model) may integrate a Seq2Seq (Sequence to Sequence) task on the basis of BERT, which may initially achieve a joint training of the semantic understanding and the language generation. Using the BERT as a model structure, the UNILM may unify a unidirectional mask language model, a bidirectional mask language model and a Seq2Seq model by using a mask mechanism.

Figure 1A:
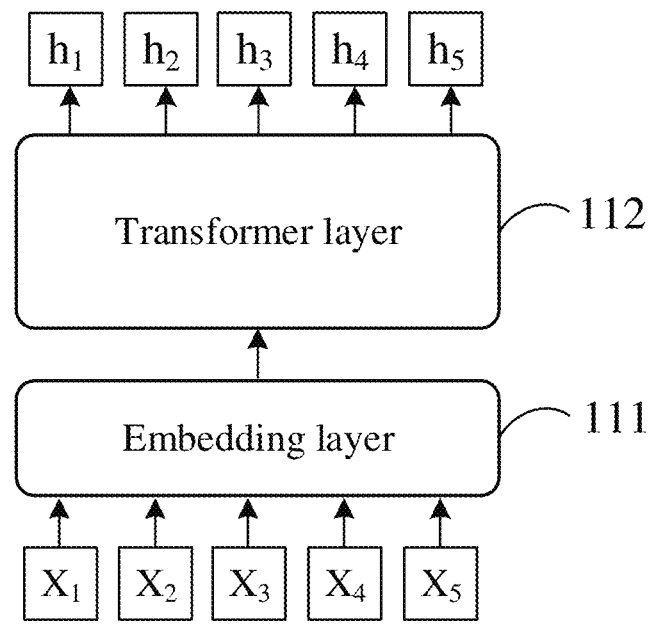
FIG. 1A shows a schematic structural diagram of a unified pre-trained language model according to an embodiment of the present disclosure.

FIG. 1A shows a schematic structural diagram of a unified pre-trained language model according to an embodiment of the present disclosure.

As shown in FIG. 1A, the unified pre-trained language model (e.g., the UNILM) may include an embedding layer 111 and a transformer layer 112. For example, using $X_1, X_2 \ldots X_5$ as an input text, the embedding layer 111 is used to perform a feature extraction and a feature vectorization representation of the input text, and output a feature vector of the input text. The transformer layer 112 is used to perform a semantic learning based on the feature vector of the input text, and output semantic features $h_1, h_2 \ldots h_5$.

For example, the embedding layer 111 may include a statement embedding layer (e.g., Segment Embedding), a position information embedding layer (e.g., Position Embedding) and a word embedding layer (e.g., Token Embedding), which are respectively used to perform a statement vectorization representation of the input text, a position information vectorization representation of each word in the input text and a vectorization representation of each word, so as to output a statement feature, a position feature and a word feature.

For example, the transformer layer 112 may include a plurality of layers of transformer modules. The transformer module is a classic model architecture in the field of natural language processing and may learn a correlation between words (or phrases) in a sentence. After the statement feature, the position feature and the word feature of the input text pass through the plurality of layers of transformer modules, a semantic feature for representing a meaning of the input text may be output.

It should be understood that the unified pre-trained language model may be used for the joint training of the semantic understanding task and the language generation task. For different language processing tasks, a calculation process for the input text $X_1, X_2 \ldots X_5$ is different, and the meaning of the output semantic features $h_1, h_2 \ldots h_5$ is also different. However, different language processing tasks may share a parameter of the unified pre-trained language model. That is, the training of different language processing tasks jointly affects the parameter of the unified pre-trained language model, and the trained unified pre-trained language model may be used for both the semantic understanding task and the language generation task.

By completely sharing a model parameter, the unified pre-trained language model may achieve the unified training of the semantic understanding task and the language generation task. However, as two different research modes, the semantic understanding and the language generation have a similarity and a difference. For the similarity, sharing the model parameter may complement each other, but for the difference, sharing the model parameter may have a negative effect.

Specifically, the unified pre-trained language model learns a plurality of types of tasks under a set of parameters. For the plurality of types of tasks, sharing the parameter at a model bottom for extracting a basic feature may not affect each other, but sharing the parameter when extracting a task-specific feature may have a negative effect.

In view of this, the embodiments of the present disclosure propose a method of training a natural language processing model and a method of processing a natural language.

Figure 1B:
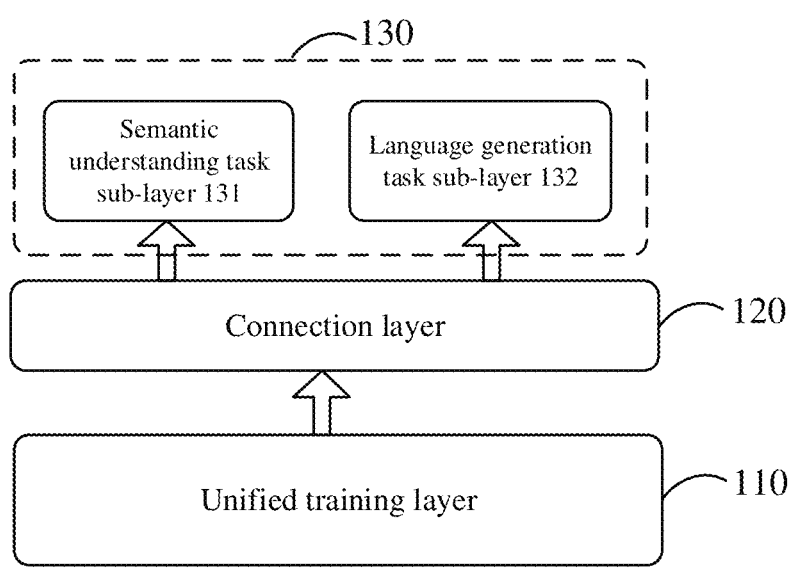
FIG. 1B shows a schematic system diagram of a method of training a natural language processing model and/or a method of processing a natural language according to an embodiment of the present disclosure.

FIG. 1B shows a schematic system diagram of a method of training a natural language processing model and/or a method of processing a natural language according to an embodiment of the present disclosure.

As shown in FIG. 1B, a system for the method of training the natural language processing model and/or the method of processing the natural language may include a unified training layer 110, a connection layer 120 and an independent training layer 130. The independent training layer 130 may include a plurality of task sub-layers, and each task sub-layer is used for a language processing branch task. For example, the independent training layer 130 may include a semantic understanding task sub-layer 131 and a language generation task sub-layer 132.

The unified training layer 110 may include a unified pre-trained language model for a unified training of a plurality of language processing branch tasks. The connection layer 120 is used to connect the unified training layer 110 and the independent training layer 130, and may transmit, for different tasks, an output result from the unified training layer 110 to a corresponding task sub-layer in the independent training layer 130.

Each task sub-layer in the independent training layer 130 may include a model for an independent training for different branch tasks (referred to as a branch task model). Each branch task model may include a plurality of transformer modules for analyzing and calculating the semantic feature so as to perform the language processing branch task.

According to the embodiments of the present disclosure, the independent training of each branch task is performed on the basis of the unified pre-trained language model, so as to achieve a purpose of performing a unified training for the similarity of multiple-tasks and performing an independent training for the difference of the multi-tasks, which may improve a processing effect of the natural language processing model on each language processing task.

It should be understood that the embodiments of the present disclosure propose a collaborative unified pre-trained framework including the unified training layer and the independent training layer, so that a plurality of types of tasks may jointly train the unified training layer to extract a basic feature information, and each type of task may train a specific task branch to extract a high-level semantic information required by the task. In this way, a model may have a good effect on the plurality of types of tasks.

Figure 2:
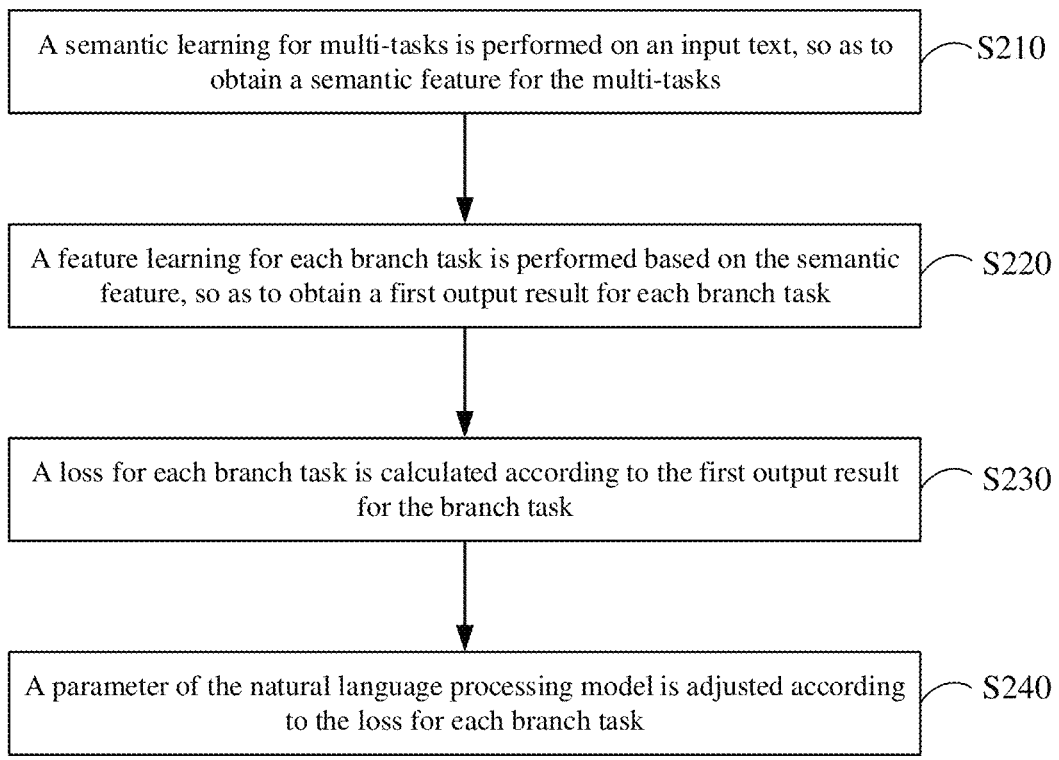
FIG. 2 shows a flowchart of a method of training a natural language processing model according to an embodiment of the present disclosure.

FIG. 2 shows a flowchart of a method of training a natural language processing model according to an embodiment of the present disclosure.

As shown in FIG. 2, a method 200 of training a natural language processing model may include operation S210 to operation S240.

In operation S210, a semantic learning for multi-tasks is performed on an input text, so as to obtain a semantic feature for the multi-tasks.

For example, the multi-tasks may include a plurality of types of tasks, and each type of task may correspond to a branch. For example, a semantic understanding task, a language generation task, a common sense reasoning task and a knowledge graph task are all branch tasks of natural language processing. The natural language processing model may include a unified pre-trained language model (e.g., UNILM), and the plurality of branch tasks (i.e., a plurality of types of tasks) may be jointly trained through the unified pre-trained language model.

For example, the input text may contain at least one statement, and each statement may contain at least one word. Since different branch tasks have different task forms, a calculation process for the input text may be different, and then the semantic feature output by the unified pre-trained language model may have different meaning. The unified pre-trained language model may perform a statement vectorization representation of the input text, a position information vectorization representation of each word in the input text, and a vectorization representation of each word so as to obtain a statement feature, a position feature and a word feature, then learn a correlation between words (or phrases) according to the statement feature, the position feature and the word feature of the input text, and then output the semantic feature.

For example, for the semantic understanding task, the output semantic feature may represent a semantic understanding information of the input text. For another example, for the language generation task, the output semantic feature may represent a following-text information of the input text.

In operation S220, a feature learning for each branch task is performed based on the semantic feature, so as to obtain a first output result for each branch task.

For example, the natural language processing model may further include a plurality of branch task models, and each branch task model is used to perform an independent training for the corresponding branch task. For different branch tasks, the semantic feature output based on the unified pre-trained language model may be input into the corresponding branch task model, and the branch task model may be used for the independent training for the branch task, so as to achieve the purpose of performing a joint training for the similarity of the plurality of branch tasks and performing an independent training for the difference of the plurality of branch tasks.

It should be understood that since the unified pre-trained language model jointly trains the plurality of branch tasks, the plurality of branch tasks share the parameter of the unified pre-trained language model. That is, the training of the plurality of branch tasks jointly affect the parameter of the unified pre-trained language model. Therefore, although the semantic feature output by the unified pre-trained language model may be used to represent the meaning for different branch tasks, the semantic feature is also affected by different branch tasks.

In the embodiment of the present disclosure, the independent training for each branch task is performed separately on the basis of the semantic feature output by the unified pre-trained language model, so as to achieve the purpose of performing the joint training for the similarity of the plurality of branch tasks and performing the independent training for the difference of the plurality of branch tasks. In this way, a negative impact of different branch tasks on the parameter of the natural language processing model may be avoided, and a processing effect of the natural language processing model on each branch task may be improved.

In operation S230, a loss for each branch task is calculated according to the first output result for the branch task.

For example, each branch task model may perform the independent training for each branch task and output a first output result for the branch task. A loss for each branch task may be calculated according to a difference between a label of the input text for the branch task and the first output result.

For example, for the semantic understanding task, the input text may have a label indicating a semantic understanding information, and the first output result may be output after the unified training of the unified pre-trained language model and the independent training for the semantic understanding branch task. The first output result may indicate the semantic understanding information of the input text predicted by the natural language processing model. According to a difference between the semantic understanding information indicated by the label and the predicted semantic understanding information, a loss of the natural language processing model processing the semantic understanding task, that is, the loss for the semantic understanding task, may be calculated.

Similarly, a loss for the language generation task, a loss for the common sense reasoning task and a loss for the knowledge graph task may be obtained.

In operation S240, a parameter of the natural language processing model is adjusted according to the loss for each branch task.

For example, the parameter of the natural language processing model may be adjusted based on a sum of losses generated by the independent training of various branch tasks, such as the loss for the semantic understanding task, the loss for the language generation task, the loss for the common sense reasoning task and the loss for the knowledge graph task, so as to update the natural language processing model. Then, for a next input text, the process may return to the step of performing the semantic learning for multi-tasks on the input text by using the updated natural language processing model, until a preset condition is met. The preset condition may be a convergence of the sum of losses for the various branch tasks.

It should be understood that an adjustment of the parameter of the natural language processing model may include at least one of an adjustment of the parameter of the unified pre-trained language model and an adjustment of the parameter of the branch task model for the independent training of each branch task.

According to the embodiments of the present disclosure, the independent training of each branch task is performed on the basis of the unified pre-trained language model, so as to achieve the purpose of performing the joint training for the similarity of the plurality of branch tasks and performing the independent training for the difference of the plurality of branch tasks, which may improve a processing effect of the natural language processing model on each language processing task.

Different branch tasks performed based on the above-described natural language processing model will be described below with reference to FIG. 3A to FIG. 3C.

Figures 3A, 3B, 3C:
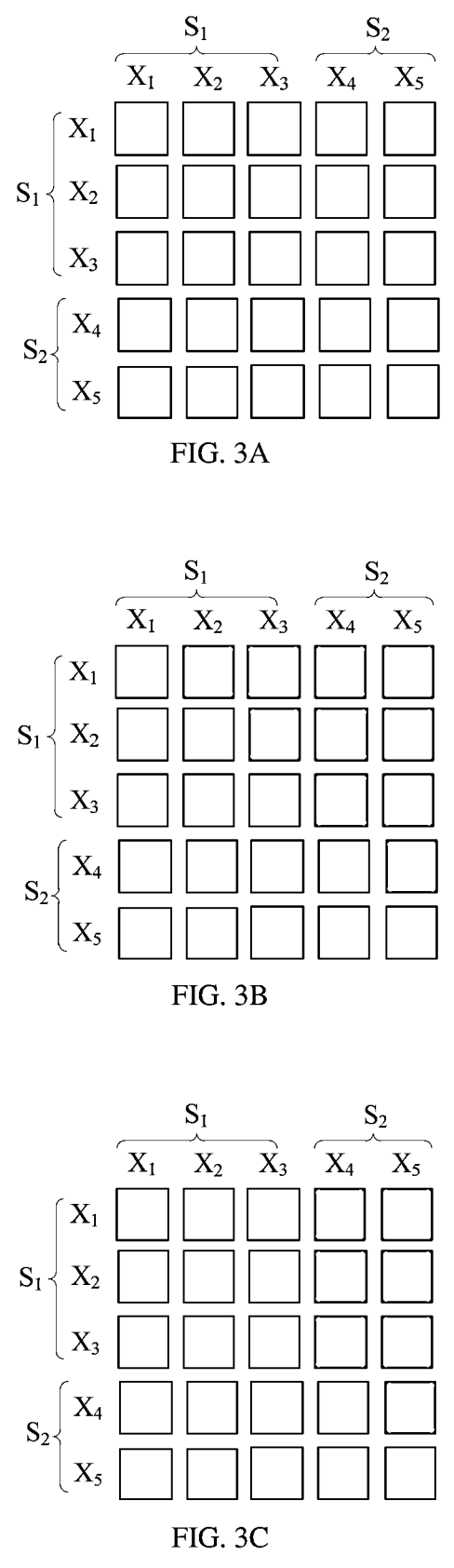

FIG. 3A shows a schematic diagram of performing a semantic understanding task based on the above-described natural language processing model according to an embodiment of the present disclosure.

FIG. 3B shows a schematic diagram of performing a word-level semantic generation task based on the above-described natural language processing model according to an embodiment of the present disclosure.

FIG. 3C shows a schematic diagram of performing a sentence-level semantic generation task based on the above-described natural language processing model according to an embodiment of the present disclosure.

The above-described natural language processing model includes a unified pre-trained language model and a plurality of branch task models for performing various branch tasks. Each branch task model may include a plurality of transformer modules for analyzing and calculating based on the semantic feature so as to perform the language processing branch task.

As shown in FIG. 3A to FIG. 3C, $S_1$ and $S_2$ are two sentences (or statements) in the input text. $S_1$ contains words (or phrases) $X_1$, $X_2$ and $X_3$, and $S_2$ contains words (or phrases) $X_4$ and $X_5$. Each box may represent a meaning of a word (or phrase). A white box indicates that the meaning of the word represented by the box may be known through the calculation of the transformer module, and a gray box indicates that the meaning of the word represented by the box may not be known through the calculation of the transformer module.

For FIG. 3A, a branch task model for performing the semantic understanding may be a bidirectional MLM (Mask Language Model), a principle of which is to randomly mask a preset percentage (e.g., 15%) of words (or phrases) in the input text, encode and input the input text into the transformer module, and then obtain the information of all words (or phrases) in the input text through the calculation of the transformer module.

As shown in FIG. 3A, for $X_1$, the meaning of $X_1 \ldots X_5$ may be obtained through the calculation of the transformer module. Similarly, for $X_2$, the meaning of $X_1 \ldots X_5$ may also be obtained through the calculation of the transformer module. In other words, for each word in the input text, the transformer module may output a preceding-text information and a following-text information for the word. That is, an output of the transformer module may contain the meaning of each word in the input text, which may be understood as the semantics of the entire input text, so as to achieve the semantic understanding of the input text.

For example, the branch task model for performing the semantic understanding may further perform a sentence-level semantic understanding task based on the preceding-text information and the following-text information for each word in the input text. For example, a logical distance between the statement $S_1$ and the statement $S_2$ may be calculated, and the logical distance indicates whether the sentences have a logical order or not. For another example, for the input text containing a plurality of statements, the logical order of the statements may be determined, so as to reorder the plurality of statements, and so on.

For FIG. 3B, for example, a branch task model for performing a word-level semantic generation may be a unidirectional MLM (Unidirectional Mask Language Model). The unidirectional MLM may include a left-to-right language model (L2R LM) and a right-to-left language model (R2L LM).

FIG. 3B may be a schematic diagram of the left-to-right language model, a principle of which is to randomly mask a preset percentage (e.g., 0~100%) of words (or phrases) in the input text, encode and input the input text into the transformer module, and then obtain an information of the word (or phrase) and an information of all words (or phrases) prior to the word (that is, the preceding-text information (or historical information)) through the calculation of the transformer module.

As shown in FIG. 3B, for $X_5$, the meaning of $X_1 \ldots X_5$ may be obtained through the calculation of the transformer module. Similarly, for $X_4$, the meaning of $X_1 \ldots X_4$ may be obtained through the calculation of the transformer module. In other words, for each word in the input text, the transformer module may output the word and the preceding-text information for the word. That is, the output of the transformer module contains all the preceding-text information. The following-text information may be predicted based on the preceding-text information, so as to perform the unidirectional-MLM-based word-level language generation task.

Similarly, a principle of the right-to-left language model is to randomly mask a preset percentage (e.g., 0~100%) of words (or phrases) in the input text, encode and input the input text into the transformer module, and then obtain the information of the word (or phrase) and the information of all words (or phrases) subsequent to the word (that is, the following-text information) through the calculation of the transformer module. The preceding-text information may be predicted based on the following-text information, so as to perform the unidirectional-MLM-based word-level language generation task.

For FIG. 3C, for example, a branch task model for performing a sentence-level semantic generation may be a Seq2Seq language model (Sequence to Sequence Language Model, S2S LM), a principle of which is to randomly mask a preset percentage (e.g., 0~100%) of words (or phrases) in a second sentence of the input text, encode and input the input text into the transformer module, so that through the calculation of the transformer module, each word (or phrase) in a first sentence may obtain the meaning of all other words (or phrases) in the first sentence but may not obtain the meaning of words (or phrases) in the second sentence, while the masked word in the second sentence may obtain the meaning of all words (or phrases) in the first sentence and the preceding-text information prior to the word in the second sentence. That is, the output of the transformer module contains the meaning of all words (or phrases) in the first sentence and contains the preceding-text information for the masked word (or phrase) in the second sentence. Therefore, the Seq2Seq language model may be used to predict a sentence-level following-text information and perform a sentence-level language generation task.

As shown in FIG. 3C, for each word in the first sentence $S_1$, the meaning of all words $X_1$, $X_2$ and $X_3$ may be obtained through the calculation of the transformer module. For $X_4$ in the second sentence $S_2$, the meaning of $X_1$, $X_2$, $X_3$ and $X_4$ may be obtained through the calculation of the transformer module. For $X_5$ in the second sentence $S_2$, the meaning of $X_1$, $X_2$, $X_3$, $X_4$ and $X_5$ may be obtained through the calculation of the transformer module. That is, the output of the transformer module contains the meaning of the first sentence and the preceding-text information for all masked words in the second sentence, so that the next sentence may be predicted and the sentence-level language generation task may be performed.

It should be noted that the bidirectional MLM task is characterized in that 15% of words (tokens) is involved in each training, while the unidirectional MLM task and the S2S LM task are characterized in that 100% of tokens may be predicted. The unified pre-trained language model may unify three language processing models including the bidirectional MLM, the unidirectional MLM and the Seq2Seq LM. However, in order to adapt to different tasks, a training form of the task needs to be adjusted. For example, only 15% of tokens may be involved in each training for the unidirectional MLM task and the S2S LM task, so that 85% loss may be generated compared with the training for an original MLM task and S2S LM task. Therefore, a model convergence may be slow, which may result in a waste of resources and time.

The embodiments of the present disclosure may be implemented to perform independent training for each branch task on the basis of the unified pre-trained language model, that is, each branch task may retain a task characteristic without making an adaptation adjustment during the training. For example, the unidirectional MLM task and the S2S LM task are characterized in that 100% of tokens may be predicted, so that an error may be avoided and a model training efficiency may be improved.

It should be noted that the semantic generation task performed based on the above-described natural language processing model may be used to achieve a prediction of one or more words in the preceding-text information or the following-text information.

Figure 4A:
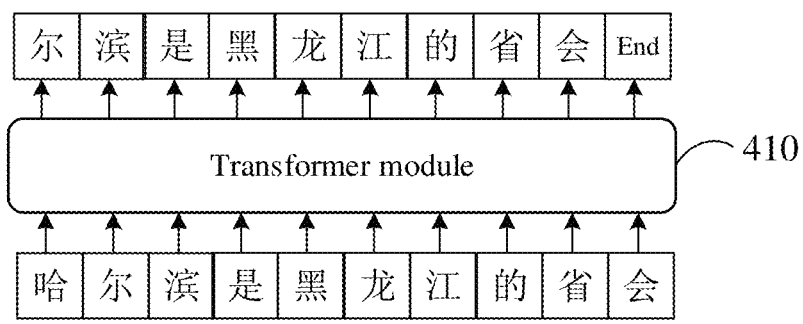
FIG. 4A and FIG. 4B show schematic diagrams of performing a semantic generation task based on the above-mentioned natural language processing model according to an embodiment of the present disclosure.

FIG. 4A shows a schematic diagram of performing a semantic generation task based on the above-described natural language processing model according to an embodiment of the present disclosure.

Figure 4B:
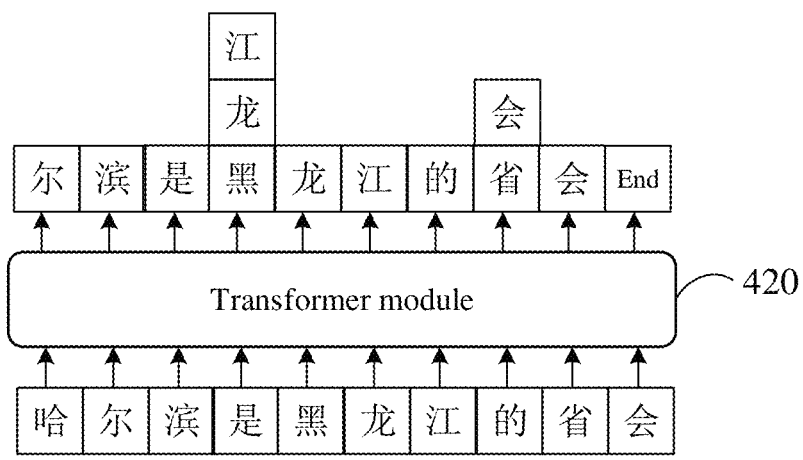

FIG. 4B shows a schematic diagram of performing a semantic generation task based on the above-described natural language processing model according to another embodiment of the present disclosure.

The natural language processing model includes a unified pre-trained language model and a plurality of branch task models for performing various branch tasks. The branch task model for performing the semantic generation may be a left-to-right language model, which may learns each word (or phrase) of the input text, so that each word (or phrase) may only obtain the word (or phrase) and the preceding-text information for the word (or phrase), and the following-text information may be predicted based on the preceding-text information, so as to perform the language generation task.

The left-to-right language model may further include a left-to-right N-Gram language model (N-GLM). A traditional left-to-right language model may predict a word (or phrase) in the following-text information based on the preceding-text information, and the left-to-right N-Gram language model may simultaneously predict a plurality of words (or phrases) in the following-text information based on the preceding-text information.

FIG. 4A shows a schematic diagram of predicting a word (or phrase) in the following-text information. For example, the input text may be "哈尔滨是黑 龙江的省会 (Chinese characters indicating Harbin is the capital of Heilongjiang province)". For each word in the input text, a word subsequent to the word may be predicted through a semantic learning of a transformer module 410 of the left-to-right language model (such as GPT-3). For example, "尔" may be predicted for "哈", "滨" may be predicted for "尔", and so on.

FIG. 4B shows a schematic diagram of simultaneously predicting a plurality of words (or phrases) in the following-text information. The input text may be "哈尔滨是 黑龙江的 省会". For each word in the input text, a plurality of words subsequent to the word may be predicted through a semantic learning of a transformer module 420 of the left-to-right N-Gram language model (such as ERNIE 3.0). For example, "龙江" may be predicted for "黑", "会" may be predicted for "省", and so on.

According to the embodiments of the present disclosure, the training for the language generation task may be performed based on the unified pre-trained language model, and one or more words in the following-text information may be output for each word in the input text, so as to perform the language generation task.

Figure 5:
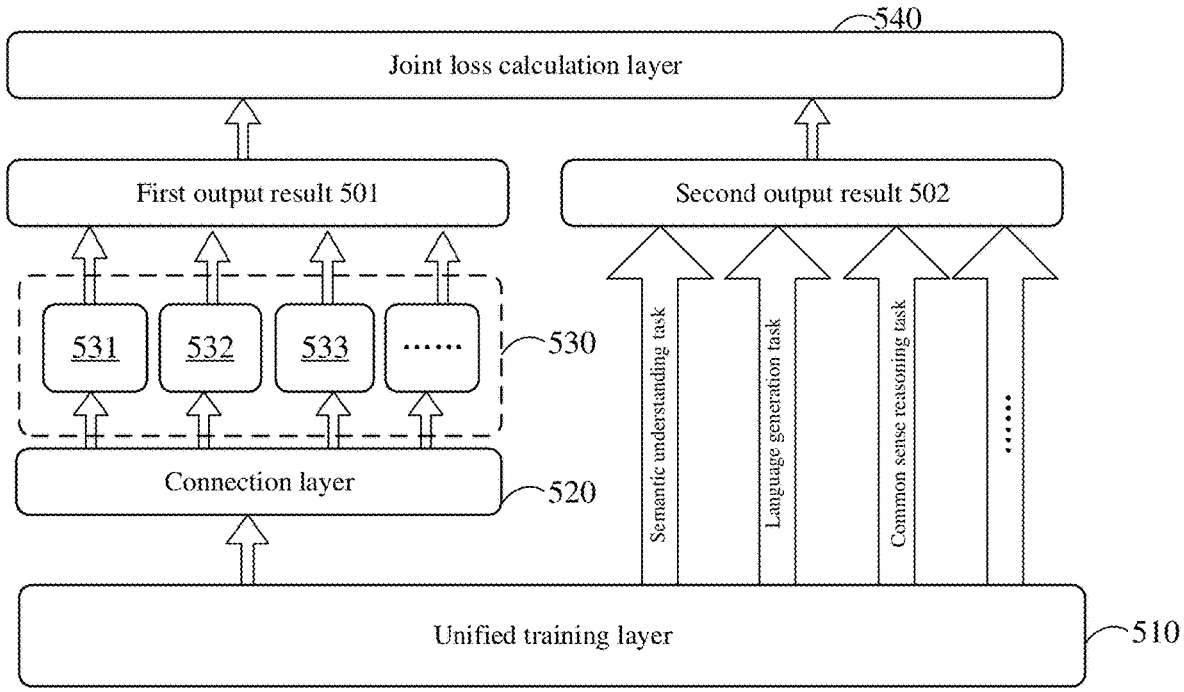
FIG. 5 shows a schematic system diagram of a method of training a natural language processing model and/or a method of processing a natural language according to another embodiment of the present disclosure.

FIG. 5 shows a schematic system diagram of a method of training a natural language processing model and/or a method of processing a natural language according to another embodiment of the present disclosure.

As shown in FIG. 5, a system for the method of training the natural language processing model and/or the method of processing the natural language may include a unified training layer 510, a connection layer 520, an independent training layer 530 and a joint loss calculation layer 540.

The independent training layer 530 may include a plurality of task sub-layers, and each task sub-layer is used for a language processing branch task. For example, the independent training layer 530 may include a semantic understanding task sub-layer 531, a language generation task sub-layer 532 and a common sense reasoning task sub-layer 533. It should be noted that the independent training layer 530 may further expand more branch tasks, such as a knowledge graph task sub-layer, according to actual needs.

On the one hand, for the input text, after the unified training of the unified training layer 510, the output semantic feature may be transmitted to a corresponding task sub-layer in the independent training layer 530 through the connection layer 520. For example, for the input text for the semantic understanding task, a semantic feature for the semantic understanding task may be output by the unified training layer 510, and the connection layer 520 may input the semantic feature into the semantic understanding task sub-layer 531 to perform an independent training for the semantic understanding task. An output result for the independent training of each task sub-layer is a first output result 501.

On the other hand, for the input text, after the unified training of the unified training layer 510, the obtained semantic feature may be used as a second output result 502. For different branch tasks, the second output result 502 may represent different meanings.

The joint loss calculation layer 540 may calculate a joint loss based on the first output result 501 and the second output result 502. Then, the loss for the independent training and the loss for the unified training may be integrated as an overall loss of the natural language processing model, which may be used for the adjustment of the parameter of the natural language processing model. In this way, the natural language processing model may converge faster, and the training efficiency of the natural language processing model may be improved.

Figure 6:
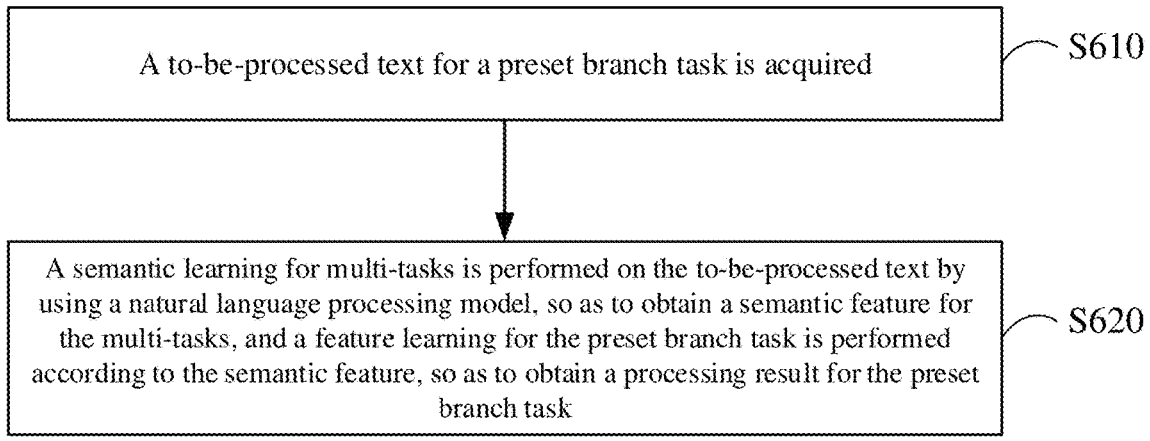
FIG. 6 shows a flowchart of a method of processing a natural language according to an embodiment of the present disclosure.

FIG. 6 shows a flowchart of a method of processing a natural language according to an embodiment of the present disclosure.

As shown in FIG. 6, a method 600 of processing a natural language includes operation S610 to operation S620.

In operation S610, a to-be-processed text for a preset branch task is acquired.

In operation S620, a semantic learning for multi-tasks is performed on the to-be-processed text by using a natural language processing model, so as to obtain a semantic feature for the multi-tasks, and a feature learning for the preset branch task is performed according to the semantic feature, so as to obtain a processing result for the preset branch task.

The multi-tasks may include a plurality of branch tasks, and the preset branch task is one of the plurality of branch tasks. The natural language processing model is trained using the method of training the natural language processing model described above.

For example, the preset branch task may be a semantic understanding task, and an input text for the semantic understanding task may be input into the above-described natural language processing model. The natural language processing model may perform a semantic learning for multi-tasks on the input text and output a semantic feature for the semantic understanding task, and perform an independent feature learning for the semantic understanding task based on the semantic feature, so as to obtain a processing result for the semantic understanding task. The processing result may represent the semantics of the input text.

According to the embodiments of the present disclosure, the feature learning for the branch task may be performed based on the semantic feature obtained by performing the semantic learning for multi-tasks on the input text, so as to achieve the purpose of performing the joint learning for the similarity of the multi-tasks and performing the independent learning for the difference of the multi-tasks, which may improve the processing effect on each branch task for the natural language processing.

Figure 7:
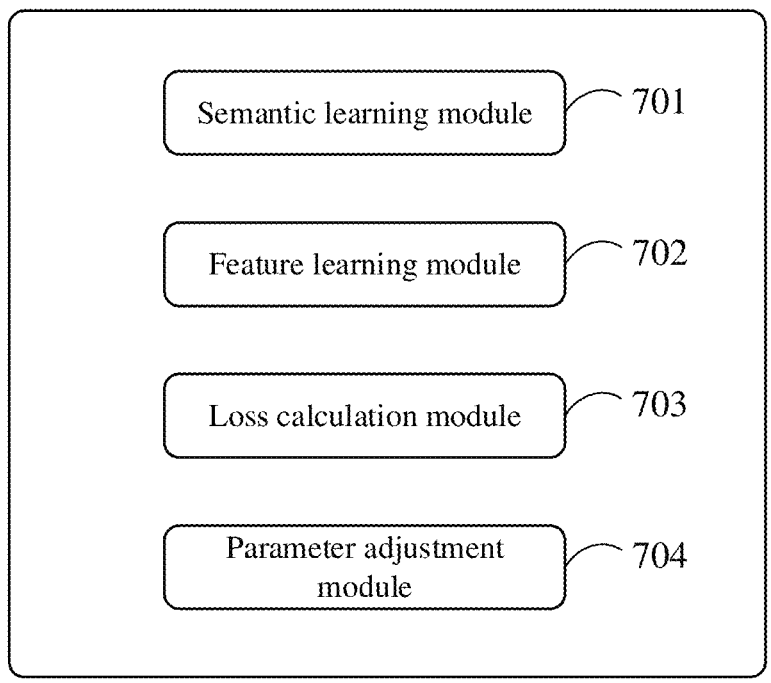
FIG. 7 shows a block diagram of an apparatus of training a natural language processing model according to an embodiment of the present disclosure.

FIG. 7 shows a block diagram of an apparatus of training a natural language processing model according to an embodiment of the present disclosure.

As shown in FIG. 7, an apparatus 700 of training a natural language processing model may include a semantic learning module 701, a feature learning module 702, a loss calculation module 703 and a parameter adjustment module 704.

The semantic learning module 701 is used to perform a semantic learning for multi-tasks on an input text, so as to obtain a semantic feature for the multi-tasks. The multi-tasks include a plurality of branch tasks.

The feature learning module 702 is used to perform a feature learning for each branch task based on the semantic feature, so as to obtain a first output result for each branch task.

The loss calculation module 703 is used to calculate a loss for each branch task according to the first output result for the branch task.

The parameter adjustment module 701 is used to adjust a parameter of the natural language processing model according to the loss for each branch task.

According to the embodiments of the present disclosure, the multi-tasks may include a first branch task for a semantic understanding; and the feature learning module 702 may include a first determination unit and a second determination unit.

The first determination unit is used to determine, for each word in the input text, a preceding-text information prior to the word and a following-text information subsequent to the word based on the semantic feature.

The second determination unit is used to determine a semantic understanding information for the input text as a first output result for the first branch task according to the preceding-text information and the following-text information.

According to the embodiments of the present disclosure, the feature learning module 702 may further include a first calculation unit and a third determination unit.

The first calculation unit is used to calculate a logical distance between a plurality of statements in the input text as the first output result for the first branch task according to the preceding-text information and the following-text information.

The third determination unit is used to determine a logical order of a plurality of statements in the input text as the first output result for the first branch task according to the preceding-text information and the following-text information.

According to the embodiments of the present disclosure, the multi-tasks may include a second branch task for a language generation; and the feature learning module 702 may include a fourth determination unit and a prediction unit.

The fourth determination unit is used to determine, for each word in the input text, a preceding-text information prior to the word based on the semantic feature.

The prediction unit is used to predict a following-text information subsequent to the word as a first output result for the second branch task based on the preceding-text information.

According to the embodiments of the present disclosure, the apparatus 700 of training the natural language processing model may further include a determination module.

The determination module is used to determine a second output result for each branch task based on the semantic feature.

According to the embodiments of the present disclosure, the loss calculation module 703 is used to calculate a loss for each branch task according to the first output result for the branch task and the second output result for the branch task.

According to the embodiments of the present disclosure, the multi-tasks may include a first branch task for a semantic understanding, and the determination module is used to perform one of operations of: determining a semantic understanding information for the input text as the second output result for the first branch task based on the semantic feature; calculating a logical distance between a plurality of statements in the input text as the second output result for the first branch task based on the semantic feature; and determining a logical order of a plurality of statements in the input text as the second output result for the first branch task based on the semantic feature.

According to the embodiments of the present disclosure, the multi-tasks may include a second branch task for a language generation, and the determination module is used to predict, for each word in the input text, a following-text information subsequent to the word as the second output result for the second branch task based on the semantic feature.

Figure 8:
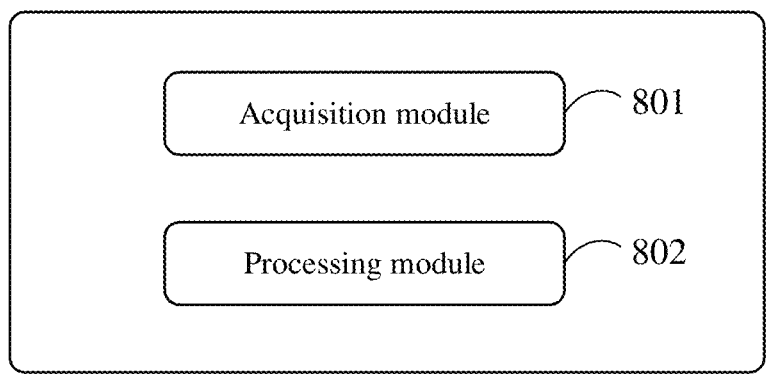
FIG. 8 shows a block diagram of an apparatus of processing a natural language according to an embodiment of the present disclosure.

FIG. 8 shows a block diagram of an apparatus of processing a natural language according to another embodiment of the present disclosure.

As shown in FIG. 8, an apparatus 800 of processing a natural language may include an acquisition module 801 and a processing module 802.

The acquisition module 801 is used to acquire a to-be-processed text for a preset branch task.

The processing module 802 is used to perform a semantic learning for multi-tasks on the to-be-processed text by using a natural language processing model so as to obtain a semantic feature for the multi-tasks, and perform a feature learning for the preset branch task according to the semantic feature so as to obtain a processing result for the preset branch task.

According to the embodiments of the present disclosure, the multi-tasks may include the preset branch task, and the natural language processing model is trained using the method of training the natural language processing model described above.

According to the embodiments of the present disclosure, the present disclosure further provides an electronic device, a readable storage medium, and a computer program product.

Figure 9:
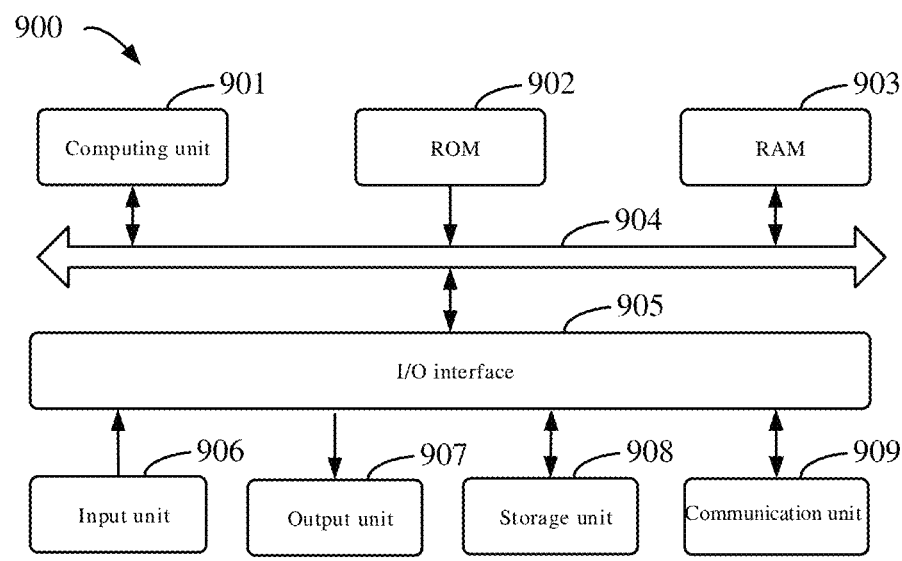
FIG. 9 shows a block diagram of a method of training a natural language processing model and/or a method of processing a natural language according to an embodiment of the present disclosure.

FIG. 9 shows a schematic block diagram of an exemplary electronic device 900 for implementing the embodiments of the present disclosure. The electronic device is intended to represent various forms of digital computers, such as a laptop computer, a desktop computer, a workstation, a personal digital assistant, a server, a blade server, a mainframe computer, and other suitable computers. The electronic device may further represent various forms of mobile devices, such as a personal digital assistant, a cellular phone, a smart phone, a wearable device, and other similar computing devices. The components as illustrated herein, and connections, relationships, and functions thereof are merely examples, and are not intended to limit the implementation of the present disclosure described and/or required herein.

As shown in FIG. 9, the electronic device 900 may include a computing unit 901, which may perform various appropriate actions and processing based on a computer program stored in a read-only memory (ROM) 902 or a computer program loaded from a storage unit 908 into a random access memory (RAM) 903. Various programs and data required for the operation of the electronic device 900 may be stored in the RAM 903. The computing unit 901, the ROM 902 and the RAM 903 are connected to each other through a bus 904. An input/output (I/O) interface 905 is further connected to the bus 904.

Various components in the electronic device 900, including an input unit 906 such as a keyboard, a mouse, etc., an output unit 907 such as various types of displays, speakers, etc., a storage unit 908 such as a magnetic disk, an optical disk, etc., and a communication unit 909 such as a network card, a modem, a wireless communication transceiver, etc., are connected to the I/O interface 905. The communication unit 909 allows the electronic device 900 to exchange information/data with other devices through a computer network such as the Internet and/or various telecommunication networks.

The computing unit 901 may be various general-purpose and/or special-purpose processing components with processing and computing capabilities. Some examples of the computing unit 901 include but are not limited to a central processing unit (CPU), a graphics processing unit (GPU), various dedicated artificial intelligence (AI) computing chips, various computing units running machine learning model algorithms, a digital signal processor (DSP), and any appropriate processor, controller, microcontroller, and so on. The computing unit 901 may perform the various methods and processes described above, such as the method of training the natural language processing model and/or the method of processing the natural language. For example, in some embodiments, the method of training the natural language processing model and/or the method of processing the natural language may be implemented as a computer software program that is tangibly contained on a machine-readable medium, such as the storage unit 908. In some embodiments, part or all of a computer program may be loaded and/or installed on the electronic device 900 via the ROM 902 and/or the communication unit 909. When the computer program is loaded into the RAM 903 and executed by the computing unit 901, one or more steps of the method of training the natural language processing model and/or the method of processing the natural language described above may be performed. Alternatively, in other embodiments, the computing unit 901 may be configured to perform the method of training the natural language processing model and/or the method of processing the natural language in any other appropriate way (for example, by means of firmware).

Various embodiments of the systems and technologies described herein may be implemented in a digital electronic circuit system, an integrated circuit system, a field programmable gate array (FPGA), an application specific integrated circuit (ASIC), an application specific standard product (ASSP), a system on chip (SOC), a complex programmable logic device (CPLD), a computer hardware, firmware, software, and/or combinations thereof. These various embodiments may be implemented by one or more computer programs executable and/or interpretable on a programmable system including at least one programmable processor. The programmable processor may be a dedicated or general-purpose programmable processor, which may receive data and instructions from the storage system, the at least one input device and the at least one output device, and may transmit the data and instructions to the storage system, the at least one input device, and the at least one output device.

Program codes for implementing the method of the present disclosure may be written in any combination of one or more programming languages. These program codes may be provided to a processor or a controller of a general-purpose computer, a special-purpose computer, or other programmable data processing devices, so that when the program codes are executed by the processor or the controller, the functions/operations specified in the flowchart and/or block diagram may be implemented. The program codes may be executed completely on the machine, partly on the machine, partly on the machine and partly on the remote machine as an independent software package, or completely on the remote machine or the server.

In the context of the present disclosure, the machine readable medium may be a tangible medium that may contain or store programs for use by or in combination with an instruction execution system, device or apparatus. The machine readable medium may be a machine-readable signal medium or a machine-readable storage medium. The machine readable medium may include, but not be limited to, electronic, magnetic, optical, electromagnetic, infrared or semiconductor systems, devices or apparatuses, or any suitable combination of the above. More specific examples of the machine readable storage medium may include electrical connections based on one or more wires, portable computer disks, hard disks, random access memory (RAM), read-only memory (ROM), erasable programmable read-only memory (EPROM or flash memory), optical fiber, convenient compact disk read-only memory (CD-ROM), optical storage device, magnetic storage device, or any suitable combination of the above.

In order to provide interaction with users, the systems and techniques described here may be implemented on a computer including a display device (for example, a CRT (cathode ray tube) or LCD (liquid crystal display) monitor) for displaying information to the user), and a keyboard and a pointing device (for example, a mouse or a trackball) through which the user may provide the input to the computer. Other types of devices may also be used to provide interaction with users. For example, a feedback provided to the user may be any form of sensory feedback (for example, visual feedback, auditory feedback, or tactile feedback), and the input from the user may be received in any form (including acoustic input, voice input or tactile input).

The systems and technologies described herein may be implemented in a computing system including back-end components (for example, a data server), or a computing system including middleware components (for example, an application server), or a computing system including front-end components (for example, a user computer having a graphical user interface or web browser through which the user may interact with the implementation of the system and technology described herein), or a computing system including any combination of such back-end components, middleware components or front-end components. The components of the system may be connected to each other by digital data communication (for example, a communication network) in any form or through any medium. Examples of the communication network include a local area network (LAN), a wide area network (WAN), and Internet.

The computer system may include a client and a server. The client and the server are generally far away from each other and usually interact through a communication network. The relationship between the client and the server is generated through computer programs running on the corresponding computers and having a client-server relationship with each other.

It should be understood that steps of the processes illustrated above may be reordered, added or deleted in various manners. For example, the steps described in the present disclosure may be performed in parallel, sequentially, or in a different order, as long as a desired result of the technical solution of the present disclosure may be achieved. This is not limited in the present disclosure.

The above-mentioned specific embodiments do not constitute a limitation on the scope of protection of the present disclosure. Those skilled in the art should understand that various modifications, combinations, sub-combinations and substitutions may be made according to design requirements and other factors. Any modifications, equivalent replacements and improvements made within the spirit and principles of the present disclosure shall be contained in the scope of protection of the present disclosure.

What is claimed is:

1. A method of training a natural language processing model, comprising:

performing a semantic learning for multi-tasks on an input text, so as to obtain a semantic feature for the multi-tasks, wherein the multi-tasks comprise a plurality of branch tasks;
performing a feature learning for each branch task based on the semantic feature, so as to obtain a first output result for each branch task;
calculating a loss for each branch task according to the first output result for the branch task;
adjusting a parameter of the natural language processing model according to the loss for each branch task; and
determining a second output result for each branch task based on the semantic feature, wherein
the multi-tasks comprise a first branch task for a semantic understanding; and
the determining a second output result for each branch task based on the semantic feature comprises one of:
determining a semantic understanding information for the input text as the second output result for the first branch task based on the semantic feature;
calculating a logical distance between a plurality of statements in the input text as the second output result for the first branch task based on the semantic feature; and
determining a logical order of a plurality of statements in the input text as the second output result for the first branch task based on the semantic feature.

2. The method of claim 1, wherein the performing a feature learning for each branch task based on the semantic feature, so as to obtain a first output result for each branch task comprises:

determining, for each word in the input text, a preceding-text information prior to the word and a following-text information subsequent to the word based on the semantic feature; and
determining a semantic understanding information for the input text as a first output result for the first branch task according to the preceding-text information and the following-text information.

3. The method of claim 2, further comprising:

calculating a logical distance between a plurality of statements in the input text as the first output result for the first branch task according to the preceding-text information and the following-text information.

4. The method of claim 2, further comprising:

determining a logical order of a plurality of statements in the input text as the first output result for the first branch task according to the preceding-text information and the following-text information.

5. The method of claim 1, wherein the multi-tasks further comprise a second branch task for a language generation; and the performing a feature learning for each branch task based on the semantic feature, so as to obtain a first output result for each branch task comprises: for each word in the input text, determining a preceding-text information prior to the word based on the semantic feature; and
predicting a following-text information subsequent to the word as a first output result for the second branch task based on the preceding-text information.

6. The method of claim 1, wherein the calculating a loss for each branch task according to the first output result for the branch task comprises:

calculating the loss for the branch task according to the first output result for the branch task and the second output result for the branch task.

7. The method of claim 1, wherein the multi-tasks further comprise a second branch task for a language generation; and the determining a second output result for each branch task based on the semantic feature further comprises:
  predicting, for each word in the input text, a following-text information subsequent to the word as the second output result for the second branch task based on the semantic feature.

8. A method of processing a natural language, comprising:
  acquiring a to-be-processed text for a preset branch task; and
  performing a semantic learning for multi-tasks on the to-be-processed text by using a natural language processing model, so as to obtain a semantic feature for the multi-tasks, and performing a feature learning for the preset branch task according to the semantic feature, so as to obtain a processing result for the preset branch task,
  wherein the multi-tasks comprise the preset branch task, and the natural language processing model is trained using operations of training a natural language processing model, comprising:
  performing a semantic learning for multi-tasks on an input text, so as to obtain a semantic feature for the multi-tasks, wherein the multi-tasks comprise a plurality of branch tasks;
  performing a feature learning for each branch task based on the semantic feature, so as to obtain a first output result for each branch task;
  calculating a loss for each branch task according to the first output result for the branch task;
  adjusting a parameter of the natural language processing model according to the loss for each branch task; and
  determining a second output result for each branch task based on the semantic feature, wherein
  the multi-tasks comprise a first branch task for a semantic understanding; and
  the determining a second output result for each branch task based on the semantic feature comprises one of:
    determining a semantic understanding information for the input text as the second output result for the first branch task based on the semantic feature;
    calculating a logical distance between a plurality of statements in the input text as the second output result for the first branch task based on the semantic feature; and
    determining a logical order of a plurality of statements in the input text as the second output result for the first branch task based on the semantic feature.

9. The method of claim 8, wherein the performing a feature learning for each branch task based on the semantic feature, so as to obtain a first output result for each branch task comprises:
  determining, for each word in the input text, a preceding-text information prior to the word and a following-text information subsequent to the word based on the semantic feature; and
  determining a semantic understanding information for the input text as a first output result for the first branch task according to the preceding-text information and the following-text information.

10. The method of claim 9, further comprising:
  calculating a logical distance between a plurality of statements in the input text as the first output result for the first branch task according to the preceding-text information and the following-text information.

11. The method of claim 8, wherein the multi-tasks further comprise a second branch task for a language generation; and the performing a feature learning for each branch task based on the semantic feature, so as to obtain a first output result for each branch task comprises: for each word in the input text,
  determining a preceding-text information prior to the word based on the semantic feature; and
  predicting a following-text information subsequent to the word as a first output result for the second branch task based on the preceding-text information.

12. The method of claim 8, wherein the calculating a loss for each branch task according to the first output result for the branch task comprises:
  calculating the loss for the branch task according to the first output result for the branch task and the second output result for the branch task.

13. The method of claim 8, wherein the multi-tasks further comprise a second branch task for a language generation; and the determining a second output result for each branch task based on the semantic feature further comprises:
  predicting, for each word in the input text, a following-text information subsequent to the word as the second output result for the second branch task based on the semantic feature.

14. An electronic device, comprising:
  at least one processor; and
  a memory communicatively connected to the at least one processor, wherein the memory stores instructions executable by the at least one processor, and the instructions, when executed by the at least one processor, cause the at least one processor to implement operations of training a natural language processing model, comprising:
  performing a semantic learning for multi-tasks on an input text, so as to obtain a semantic feature for the multi-tasks, wherein the multi-tasks comprise a plurality of branch tasks;
  performing a feature learning for each branch task based on the semantic feature, so as to obtain a first output result for each branch task;
  calculating a loss for each branch task according to the first output result for the branch task;
  adjusting a parameter of the natural language processing model according to the loss for each branch task; and
  determining a second output result for each branch task based on the semantic feature, wherein
  the multi-tasks comprise a first branch task for a semantic understanding; and
  the determining a second output result for each branch task based on the semantic feature comprises one of:
    determining a semantic understanding information for the input text as the second output result for the first branch task based on the semantic feature;
    calculating a logical distance between a plurality of statements in the input text as the second output result for the first branch task based on the semantic feature; and
    determining a logical order of a plurality of statements in the input text as the second output result for the first branch task based on the semantic feature.

15. An electronic device, comprising:
  at least one processor; and
  a memory communicatively connected to the at least one processor, wherein the memory stores instructions executable by the at least one processor, and the instructions, when executed by the at least one processor, cause the at least one processor to implement the method of claim 8.

16. A non-transitory computer-readable storage medium having computer instructions stored thereon, wherein the computer instructions allow a computer to implement the method of claim 8.

* * * * *

UNITED STATES PATENT AND TRADEMARK OFFICE
CERTIFICATE OF CORRECTION

PATENT NO. : 12,131,728 B2
APPLICATION NO. : 17/828773
DATED : October 29, 2024
INVENTOR(S) : Siyu Ding et al.

Page 1 of 2

It is certified that error appears in the above-identified patent and that said Letters Patent is hereby corrected as shown below:

In the Drawings

Sheet 3, Figs. 3B and 3C should appear as shown on the attached drawing sheet.

Signed and Sealed this
Second Day of September, 2025

Coke Morgan Stewart
*Acting Director of the United States Patent and Trademark Office*

FIG. 3B

FIG. 3C